Dec. 31, 1957  PAUL M. TAKESHITA  2,817,922
FISHING LURE
Filed Aug. 28, 1956
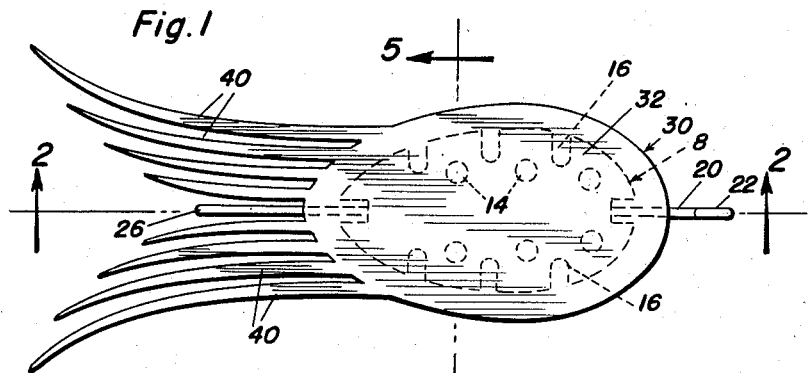
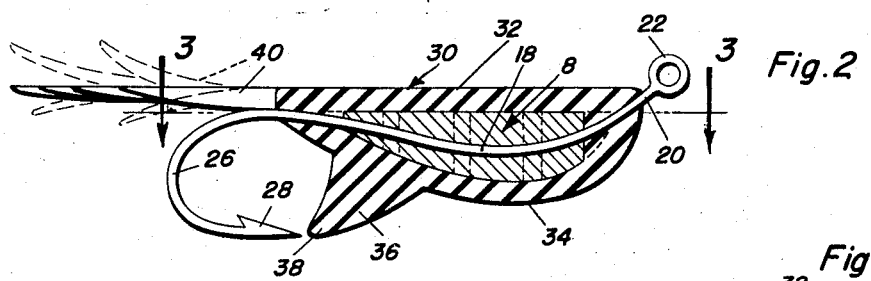
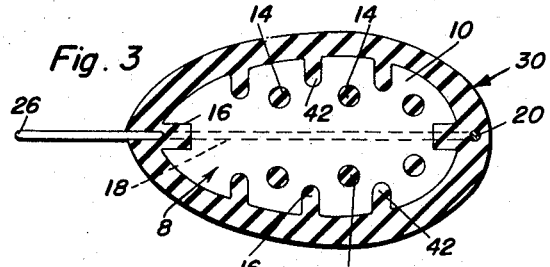
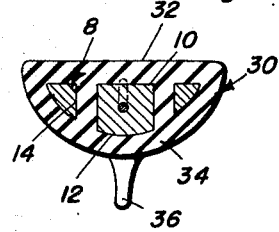
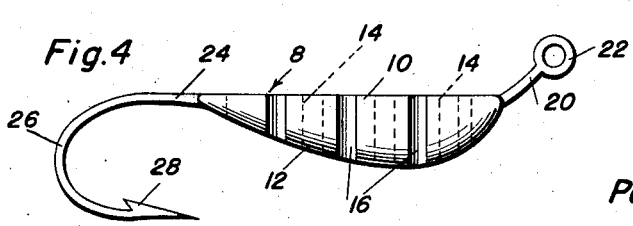
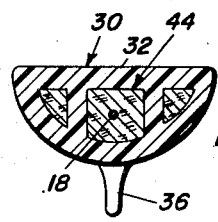
Paul M. Takeshita
INVENTOR.

United States Patent Office 2,817,922
Patented Dec. 31, 1957

2,817,922

FISHING LURE

Paul M. Takeshita, Miami, Fla.

Application August 28, 1956, Serial No. 606,587

3 Claims. (Cl. 43—42.28)

The present invention relates to an improved artificial fishing lure which is shaped exteriorly and appropriately designed and constructed to resemble a desired creature, for example, a fish, shrimp, cricket, frog or the like.

In carrying out a preferred embodiment of the invention a lure is provided wherein in its finished appearance it is somewhat ovate in plan, has a substantially flat top, and convex portions which may be described as the leading and trailing ends, sides and also the ventral portion, the trailing end being provided with a multiplicity of flexible elements which vibrate and impart the desired life-like action to the finished product.

Another object of the invention is to provide a lure which is characterized by cooperating inner and outer body components with the inner component embedded within the outer component and wherein the inner component may have a non-buoyant mass where it is to be used for casting or jigging, and alternatively, may be buoyant where it is to be used for top water floating and equivalent functions.

With the above and other objects in view the invention consists in certain novelties in construction, combination and arrangement of components which will be hereinafter more fully described and claimed.

In the accompanying drawing:

Fig. 1 is a top plan view of a fishing lure in its preferred form;

Fig. 2 is a section on the line 2—2 of Fig. 1 with portions appearing in elevation;

Fig. 3 is a horizontal section with certain portions taken on the approximate line 3—3 of Fig. 2;

Fig. 4 is an elevational view of the aforementioned inner body member;

Fig. 5 is a section on the line 5—5 of Fig. 1; and

Fig. 6 is a section like Fig. 5 except that the inner body member is constructed of buoyant material, cork for instance.

Referring now to the drawings with the aid of reference numerals, the inner body member is denoted (Figs. 1 to 5 inclusive) by the numeral 8. It is of appropriate mass and under ordinary circumstances would be lead. Its top side is substantially flat as at 10 and in plan it may be said to be substantially ovate. The leading and trailing ends and side and ventral portions may be said to be convex. In other words the major surface is convex as at 12. There are vertical holes 14 extending from the top through the ventral surface and marginal portions. The sides, rear and front are provided with notches or keying grooves 16. The intermediate portion 18 of a substantially conventional type fish hook is embedded in this body and extends through the median portion thereof from the leading toward the trailing end. The forward end of the shank 20 protrudes and terminates in a line attaching eye 22. The rearward end 24 extends beyond the corresponding end of the body member 8 and is formed into a return bend 26 having a terminal barbed point 28.

The hook-equipped inner body member is encased and in fact solidly embedded within the encasing confines of a companion outer body member 30. This is preferably a rubber body which is molded to the shape shown. That is, it is to ovate in plan and has a flat surface 32 which may be called the top and has leading and trailing ends and ventral and side portions which are convex as generally denoted at 34. On the ventral portion there is a depending V-shaped member 36 which may be construed as a fin and it will be observed that the terminal end or vertex portion 38 is in close spaced proximity to the barbed point so that the two together provide a satisfactory weed guard. The flexible and resilient tail or equivalent members 40 are provided on the trailing end and are in substantially a plane with the flat top and are of varying lengths and provide a sort of water activated tail construction.

By embedding the fish hook in the inner body member, generally of lead, the two become an entity and this entity is suitably centered in an appropriate mold (not shown) and the rubber is poured in and caused to take the shape of the mold which corresponds to the body members themselves. The rubber in fluid form passes through the holes 14 and also is embedded and keyed as at 42 in the marginal vertical open ended notches or grooves.

Structurally the modification seen in Fig. 6 is identical with that disclosed in Fig. 5 and in this sense is not necessarily a modification but is centered around the same basic concept. It is felt therefore that the same reference numerals may be utilized here since they represent corresponding parts and the only difference is that instead of the inner body member being of lead or having mass and constituting a weight as seen in Fig. 5, it is of some buoyant material such as wood or cork and is here designated by the numeral 44. It follows that the inner body member may be either buoyant or heavy as desired. The aforementioned fin or depending part 36 is flexible and this in conjunction with the fishtail elements 40 provides for the life-like and activated functioning of the over-all lure.

Heretofore, fishing lures have been adorned with attractive and colorful features, nylon hair, animal hair of all kinds and rubberized skirts tied or attached in various ways to the hook shank or to the lure bodies. In order to eliminate this process and, at the same time, to retain the attractiveness, a body part has been set aside for this special purpose. Being part of the body, it gives a natural appearance. It also saves a lot of time because there is no need to tie or attach any artificial hair, feather, etc. to give color and motion. Another advantage is that it supplies a lot of action due to the flexible characteristic of this specially selected lure material, causing it to be more attractive and enticing. The holes and grooves made in the inner body cause the inner and outer bodies to unite into one, resulting in a more durable and stronger lure. The double body construction has another purpose, the metal inner body provides weight for casting and jigging. The wood or cork body, when used instead of metal, provides floating or top-water action.

Minor changes in shape, size, materials and rearrangement of the cooperating components may be resorted to in actual practice without departing from the spirit of the invention or the invention as claimed.

What is claimed as new is as follows:

1. An artificial fishing lure comprising an outer body member generally ovate in plan, a correspondingly shaped inner body member molded and firmly embedded in said outer body member and centrally positioned within the outer body member whereby the components of the latter are snug-fitting and completely surround the inner body member, a fish hook having a shank fixedly embedded in said inner body member, portions of the shank extending through the cooperating forward portions of the inner and outer body members and terminating in a fish line attaching eye, the opposite end portion of the shank extending beyond the rear portions of the body members and having a return bend and a terminal barbed point, the trailing end portion of said outer body member having a solid prong-like depending fin tapering downwardly to a blunt-nosed point, the nose of said point being aligned with and terminating adjacent the barbed point of the fish hook, said outer body member being constructed of rubber, said fin being flexible and the rear end of said outer body member being provided with a plurality of flexible tail elements, said inner body member being marginally provided with circumferentially spaced vertical grooves and centrally positioned holes, said grooves and also said holes opening through the top and bottom surfaces of said inner body member and the cooperating portions of the outer body member being lodged in and completely filling said grooves and holes respectively, the top surfaces of said inner and outer body members being substantially flat, the bottom, sides and leading and trailing surfaces being convex.

2. The structure defined in claim 1 and wherein said inner body member is constructed of lead, is of prerequisite mass, and constitutes a weight.

3. The structure defined in claim 1 and wherein said inner body member is formed from buoyant material and functions as a float.

References Cited in the file of this patent

UNITED STATES PATENTS

| | | |
|---|---|---|
| 1,598,786 | Romadke | Sept. 7, 1926 |
| 1,686,114 | Walter | Oct. 2, 1928 |
| 2,218,280 | Deering | Oct. 15, 1940 |
| 2,311,985 | Heddon | Feb. 23, 1943 |
| 2,437,549 | Pecher | Mar. 9, 1948 |
| 2,476,733 | Jacobs | July 19, 1949 |